(No Model.)

W. D. EWART.
CHAIN WHEEL.

No. 253,994. Patented Feb. 21, 1882.

Witnesses:
E. C. Perkins
Jacob Felbel

Inventor:
Wm. D. Ewart
By atty
J. N. McIntire

UNITED STATES PATENT OFFICE.

WILLIAM D. EWART, OF CHICAGO, ILLINOIS.

CHAIN-WHEEL.

SPECIFICATION forming part of Letters Patent No. 253,994, dated February 21, 1882.

Application filed January 14, 1882. (No model.)

*To all whom it may concern:*

Be it known that I, WILLIAM DANA EWART, of Chicago, in the county of Cook and State of Illinois, have invented certain new and useful Improvements in Chain-Wheels; and I do hereby declare that the following is a full, clear, and exact description thereof, reference being had to the accompanying drawings, making part of this application.

My invention relates to a novel construction of chain-wheel or sprocket-wheel, whereby wheels cast from the same pattern may be used as either drive-wheels or driven wheels.

As is well known to those familiar with the practical operations of chain-wheels or wheels adapted to the transmission of power and motion through the medium of drive-chains or chain-belts, it is necessary, in order to have the wheels and chain run successfully, that the pitch of the teeth of the drive-wheel shall slightly exceed the pitch of the chain, while that of the teeth of the driven wheel must be slightly less than the pitch of the chain.

In the use of chain-wheels as heretofore constructed this necessary relationship of the pitches of the drive-wheel and the driven wheel, respectively, to the pitch of the chain adapted to run on said wheels has rendered it necessary to have these wheels always of different pitches, and consequently always cast from different patterns.

My invention has for its object to avoid the necessity for this use of differently made wheels, and thus render wheels cast from the same pattern capable of successfully operating as either driving-wheels or driven wheels; and to this end and object my invention consists in a chain-wheel which possesses two different pitches, according as one or the other set of the sides of the teeth or sprockets may be used as the working sides of the teeth.

To enable those skilled in the art to which my invention appertains to make and use the same, I will now proceed to more fully explain it, referring by letters to the accompanying drawings, in which I have illustrated my invention carried out in that form in which I have so far practically employed it, and which is the best now known to me.

Figure 1:
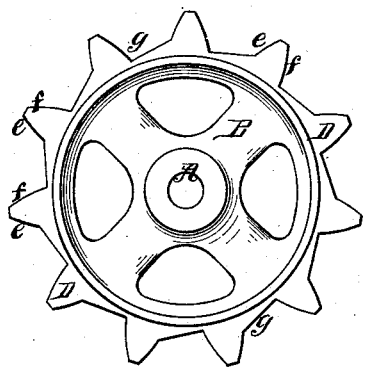
Figure 2:
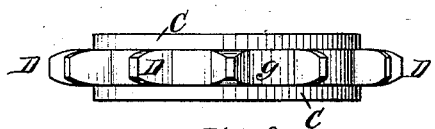
Figure 3:
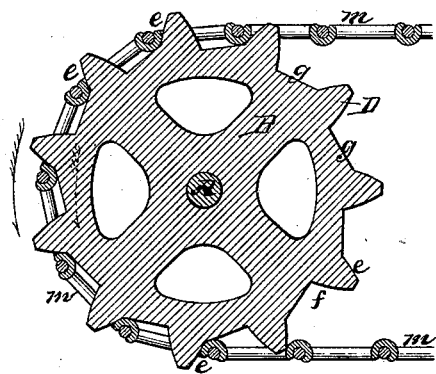

Figure 1 is a side view or elevation of a chain-wheel made according to my invention. Fig. 2 is a face or edge view of the same. Fig. 3 is a sectional view of two wheels, each like the one seen at Figs. 1 and 2, and a drive-chain banding the said two wheels together; and Fig. 4 is an edge view of said two wheels and chain.

In the several figures the same part will be found designated by the same reference-letter.

The wheels shown are made as usual with suitable hubs A, arms B, and rim C, of any known design, and of the proper proportions to render the wheel sufficiently strong and suitably light; but the sprockets or teeth D are formed upon a novel plan of construction. Instead of constructing the teeth as usual, I make one side of each tooth longer than the other; or, in other words, I have the root of each tooth at one side nearer the center of the wheel than is the other side of the tooth at its root, so that the bearing-surface of a chain-link working on the longer side of such tooth (and as low down thereon as the root of the tooth will permit the link to work) will work in a smaller pitch circle than a like chain-link bearing or working against the shorter side of said tooth, and preferably I make the surfaces which constitute the peripheral faces between the roots of the several teeth of the wheel-planes which extend directly from the root of the longer side of one tooth to the root of the shorter side of the next tooth. This novel conformation of the wheel will be clearly understood by reference now to the drawings, where it will be seen that *e* are the shorter and *f* the longer sides of all the teeth, and that *g* are the peripheral faces between the roots of the several teeth.

Figure 4:
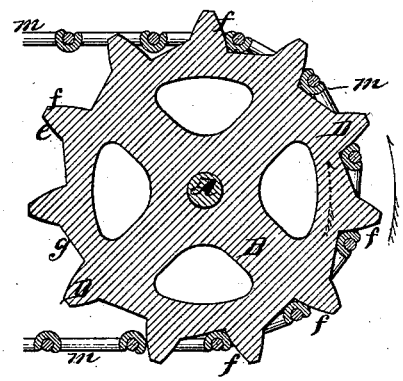

At Figs. 3 and 4 the wheel at the left is the driving-wheel, and that at the right-hand side of the drawings is the driven wheel, while *m* is a flat drive-chain, preferably of that kind known in the market as the "Ewart" chain. An observation of these figures will show that the shorter sides *e* of the teeth of the driving-wheel are the working sides and pull on the bearing-surfaces of the chain *m*, while the longer sides *f* of the teeth of the driven wheel are the working sides of the teeth of that wheel—*i. e.*, the sides against which the chain *m* pulls to drive said wheel; and it will also be seen from said figures of the drawings that those parts of the chain *m* that come into working contact with the said tooth-faces of the two wheels must travel in a larger circle at the drive-wheel than at the driven wheel, because at the former the chain must ride on that part of each of the peripheral planes which is farthest from the center of the wheel, while on the latter it will necessarily ride on that part of each of said planes which is nearest to the wheel's center, this location of the bearing parts of the chain and teeth nearer to the wheel's center in one case and farther from it in the other being the same thing in effect as if the wheels in the two cases were of different pitches.

It will of course be understood that the shape and size of wheel must be such relatively to the pitch of the chain to be run thereon that when used as shown the operative pitch circle of the wheel used as a driver and of that used as the driven wheel shall be such, respectively, that the pitch of the former shall be slightly in excess of and that of the latter slightly less than the pitch of the chain $m$.

In making my improved wheels it may be expedient and desirable to mark the castings with an arrow, as seen at Fig. 3, to indicate to the user the direction in which a wheel must always turn in order to utilize the differential pitch of the wheel.

What I claim as new, and desire to secure by Letters Patent, is—

A chain-wheel or sprocket-wheel having the roots of the teeth of different depths at their opposite sides, so as to produce a differential pitch according to whichever of said sides may be made the working sides of the teeth, for the purpose set forth.

In witness whereof I have hereunto set my hand this 3d day of January, 1882.

WILLIAM D. EWART.

In presence of—
  E. A. TURNER,
  A. D. DANA.